Nov. 8, 1938.  K. NÜCHTERLEIN  2,136,149
LENS MOUNT
Filed June 4, 1937
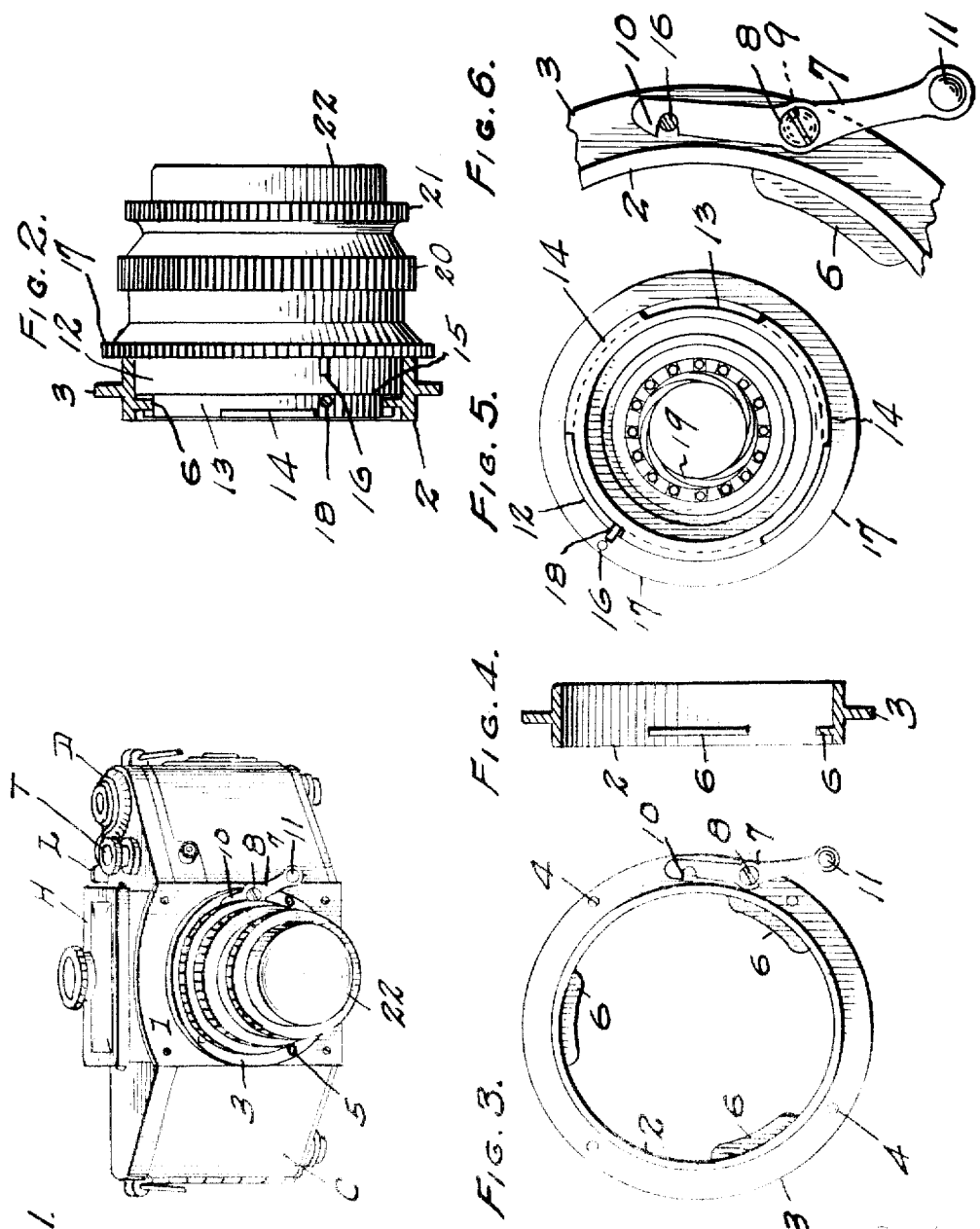
Karl Nüchterlein.
Chas K. Davies & Son
Attorney Patented Nov. 8, 1938

2,136,149

UNITED STATES PATENT OFFICE 2,136,149

LENS MOUNT

Karl Nüchterlein, Dresden, Germany, assignor to Ihagee Kamerawerk Steenbergen & Co., Dresden, Germany Application June 4, 1937, Serial No. 146,484

3 Claims. (Cl. 88—57)

My present invention relates to an improved lens mount of the quick detachable type, for photographic cameras, and while I have illustrated the lens mount in connection with a miniature camera, it will be understood that this lens mount is equally applicable for use with other types of cameras.

A complete equipment for a camera usually includes various lenses or objectives, which, when provided with my improved mounts, may be interchanged for use with the camera to meet different requirements and conditions in the art of picture taking.

By the simple construction and arrangement of parts embodied in my invention a lens mount may with facility be detached and separated from the lens-attaching part of the camera, and another lens mount substituted therefor with equal facility, to form a rigid and fixed element of the camera.

In carrying out my invention I employ co-acting members rigid with the camera and the lens mount respectively, which are quickly and frictionally interconnected or joined by a simple twist of the wrist, and then the lens mount is positively locked or latched against relative rotary movement, to prevent loosening of the mount or accidental detachment of the mount from the camera.

My invention consists in certain novel combinations and arrangements of parts as will hereinafter be more fully set forth and claimed.

In the accompanying drawing I have illustrated one complete example of the physical embodiment of my invention, wherein the parts are combined and arranged in accord with one mode I have devised for the practical application of the principles of my invention, but it will be understood that various changes and alterations may be made in the exemplifying structures, within the scope of my claims, without departing from the principles of the invention.

Figure 1 is a perspective view looking at the front of a camera that is equipped with a lens mount of my invention, the usual cap being shown in place for protection of the lens.

Figure 2 is a side view of the lens mount, showing also, in section, the attaching ring removed from the camera.

Figure 3 is a front face view of the attaching ring, separated from the camera.

Figure 4 is a transverse sectional view of the attaching ring.

Figure 5 is a face view or rear elevation of the lens mount separated from the camera, and Figure 6 is an enlarged detail fragmentary view of part of the attaching ring showing the spring pressed locking lever, detent, or hooked latch which retains the mount against rotary movement with relation to the attaching ring of the camera.

In order that the general arrangement and relation of parts may readily be understood I have shown in Figure 1 a camera of the miniature type, and designated the casing as C, an unfolding hood as H, a winding lever L and its rotary driving head D, together with the timing dial or ring T.

On the front central portion of the body or casing of the camera, an exterior flat, open-center plate 1 is fastened, as by screws, with its circular opening alined with the optical axis of the camera, and an attaching ring 2 fits neatly into the plate-opening, with the front edge of the ring projecting slightly in front of the attaching plate. This attaching ring is fashioned with an exterior annular attaching flange 3 that is provided with holes 4 for the attaching screws 5, and by means of the screws the ring is permanently fixed on the attaching plate, and becomes a part of the camera body or casing.

As best seen in Figure 3, the attaching ring is fashioned with a series of inner circumferentially arranged integral locking flanges 6, disposed at suitable intervals within the inner periphery of the ring. The number of these spaced flanges may be varied, and they form arcuate, inner ribs projecting inwardly and radially of the ring, the arcuate length of the ribs or flanges, and the spaces between these flanges forming an interrupted, inner annular flange on the ring.

On the outer face of the flange 3 of the attaching ring I mount a spring-actuated detent, lever or locking latch 7, which is pivoted at 8, on the flange 3, and provided with a spring 9 (dotted lines) coiled about the pivot of the latch. The spring tends to swing the hooked end 10 of the latch toward the ring and provides a resilient means for retaining the hooked end in locking position.

The other end of the spring latch is provided with a knob 11 that is readily accessible to the photographer, and it will be apparent that thumb pressure or finger pressure against the knob toward the attaching ring will swing the hooked end of the latch outwardly, or away from the attaching ring, against the tension of the spring, and when pressure is released, the spring 9 will return the latch to its initial position.

For co-action with the arcuate flanges 6, the main barrel 12 of the lens mount, which is reduced in diameter at its end 13, is fashioned with complementary series of arcuate flanges 14 and intervening spaces.

The arcuate, exterior flanges 14 on the perimeter of the reduced end 13 of the barrel 12, which are flush with the inner face of the reduced end, are of the required length to permit them to pass through the complementary spaces between the arcuate flanges 6 of the attaching ring. As best seen in Figures 2 and 4 the arcuate flanges 6 are inset from the edge or back face of the attaching ring, so that, when the inner end of the barrel is inserted in the outer end of the attaching ring the flanges 14 pass through the openings between the arcuate flanges 6, and beyond these flanges 6. Then, by a twist of the wrist, the lens mount is turned to bring the flanges 14 back of and into frictional contact with the arcuate flanges 6, and at the same time the annular shoulder 15 of the barrel 12 frictionally engages the outer faces of the flanges 6 of the attaching ring. These parts are fitted closely so that considerable force is necessary to frictionally engage the adjoining faces of the arcuate cams or ribs, and the friction temporarily holds the mount in place.

The hooked end 10 of the locking latch, however, is employed to positively retain the mount in the attaching ring, and prevent turning of the mount or accidental detachment thereof.

For co-action with the hooked end of the locking latch I provide a pin 16 rigid with the exterior knurled ring 17 and projecting therefrom parallel with the longitudinal axis of the mount, and this pin is located in such position that when the mount has been properly turned or twisted into engagement with the attaching ring, the pin will be in position to be engaged by the hooked end of the locking latch. A small stop screw 18 is threaded in the perimeter of the cylindrical, reduced end of the barrel, and located in position to stop the turning movement of the barrel as it is being twisted into place, and this stop screw insures that the turning of the mount will stop at a point where the hooked end will snap over the pin 16 as in Figure 6, and thereby retain the mount from rotary movement in either direction.

For removal or separation of the mount from the camera, finger pressure is first applied to the knob 11 to disengage the hooked end of the locking latch from the pin 16, and then a reverse or anti-clockwise twist of the mount releases the arcuate flanges 14 from the flanges 6 and the lens mount may then be pulled or withdrawn, longitudinally, from the attaching ring.

Within the lens mount is carried the iris-diaphragm 19 that is adjusted by turning the knurled ring 20; the knurled ring 21 is turned to focus the lens within the mount for distance, and a cap 22 is shown in Figure 1 for protecting the lens within the mount.

Having thus fully described my invention, what I claim as new and desire to secure by Letters Patent is:—

1. The combination with a camera having a fixed attaching ring, circumferentially spaced interior arcuate flanges on the ring, a spring-pressed locking latch pivotally mounted on the ring and having a notch adjacent one end thereof, the other end of said latch comprising an operating lever and being spaced from said ring, of a lens mount including a barrel having complementary arcuate interior flanges for frictional engagement with the first mentioned flanges, a pin on said barrel adapted to be engaged by said notch upon rotation of said barrel to locking position, and means limiting the movement of said barrel whereby the rotation of said barrel is stopped when said pin is alined with said notch.

2. The combination with a camera having a fixed attaching ring, circumferentially spaced interior, arcuate flanges on the ring, a spring-pressed locking latch pivotally mounted on the ring and having a notch adjacent one end thereof, the other end of said latch comprising an operating lever and being spaced from said ring, of a lens mount including a barrel having complementary arcuate interior flanges for frictional engagement with said first mentioned flanges, a pin on said barrel adapted for engagement with said notch upon rotation of said barrel to locking position, and a stop pin on the barrel adapted to engage one of said ring flanges to limit the rotation of the barrel at a point where the first said pin is alined with said notch.

3. The combination with a camera having a fixed attaching ring, circumferentially spaced interior, arcuate flanges on the ring, an angular spring-pressed locking latch pivotally mounted on the ring and having a notch adjacent one end thereof, the other end of said latch comprising an operating lever and being normally spaced from said ring, of a lens mount including a barrel having complementary arcuate flanges, for frictional engagement with said first mentioned flanges, a pin on said barrel adapted for engagement with said notch upon rotation of said barrel to locking position, and a stop pin on the barrel adapted to engage one of said ring flanges to limit the rotation of the barrel at a point where the first said pin is alined with said notch.

KARL NÜCHTERLEIN.